United States Patent
Sannikka

(10) Patent No.: US 6,837,179 B2
(45) Date of Patent: Jan. 4, 2005

(54) PARTITIONED CAT LITTER BOX

(76) Inventor: Martti Johannes Sannikka, 2 Milner Rd., Artarmon NSW (AU), 2064

(*) Notice: Subject to any disclaimer, the term of this patent is extended or adjusted under 35 U.S.C. 154(b) by 0 days.

(21) Appl. No.: 10/443,055

(22) Filed: May 22, 2003

(65) Prior Publication Data

US 2004/0244707 A1 Dec. 9, 2004

(51) Int. Cl.[7] .............................................. A01K 29/00
(52) U.S. Cl. ...................................... 119/165; 119/166
(58) Field of Search ................................. 119/165, 166, 119/168, 66.1; 47/66.5, 86, 87

(56) References Cited

U.S. PATENT DOCUMENTS

| | | | | |
|---|---|---|---|---|
| 2,963,003 A | * | 12/1960 | Oberg et al. | 119/166 |
| 3,827,401 A | * | 8/1974 | Franzl | 119/169 |
| 4,217,857 A | * | 8/1980 | Geddie | 119/166 |
| 4,444,148 A | * | 4/1984 | Lander | 119/165 |
| 5,211,133 A | * | 5/1993 | Foley | 119/166 |
| 5,220,885 A | * | 6/1993 | Goetz | 119/165 |
| 5,293,837 A | * | 3/1994 | Caldwell | 119/166 |
| 5,315,786 A | * | 5/1994 | Smith et al. | 47/74 |
| 5,325,815 A | * | 7/1994 | Gumpesberger | 119/166 |
| 5,353,743 A | * | 10/1994 | Walton | 119/166 |
| 5,515,812 A | * | 5/1996 | Faust | 119/166 |
| 5,598,810 A | * | 2/1997 | Lawton, III | 119/166 |
| 5,598,811 A | * | 2/1997 | Merchant | 119/166 |
| 5,699,754 A | * | 12/1997 | Cahajla | 119/166 |
| 5,701,844 A | * | 12/1997 | Murphy | 119/166 |
| 5,701,845 A | * | 12/1997 | Jablonski et al. | 119/166 |
| 5,727,691 A | * | 3/1998 | Vittrup | 209/235 |
| 5,755,182 A | * | 5/1998 | Brown et al. | 119/166 |
| 5,797,346 A | * | 8/1998 | Lewis | 119/166 |
| 5,799,610 A | * | 9/1998 | Poulos | 119/166 |
| 5,893,336 A | * | 4/1999 | Vice et al. | 119/166 |
| 5,988,108 A | * | 11/1999 | Silver | 119/166 |
| 6,009,836 A | * | 1/2000 | Neary et al. | 119/165 |
| 6,401,660 B1 | * | 6/2002 | Wolff | 119/165 |
| RE37,821 E | * | 8/2002 | VanWingerden | 47/73 |
| 6,526,693 B2 | * | 3/2003 | Cochran | 47/66.5 |

* cited by examiner

Primary Examiner—Yvonne R. Abbott
(74) Attorney, Agent, or Firm—Molins and Co.

(57) ABSTRACT

A base 12 supports small disposable containers 18 in an array. Each container holds a portion of litter 20. Containers are preferably transparent or translucent. In preferred embodiments a hinged grille 14 assists in the locating of containers within the base and serves to conceal the upper rims of the containers. A containment rim 16 is optionally provided for better keeping litter within the box. Container may be reused, or sealed with a snap-on lid 26 and disposed of without cleaning. Veterinary urine samples can be collected at home without stress to the cats. Amount of urine can also be determined even when litter has absorbed it completely by weighing the individual used container before and after soiling.

20 Claims, 8 Drawing Sheets

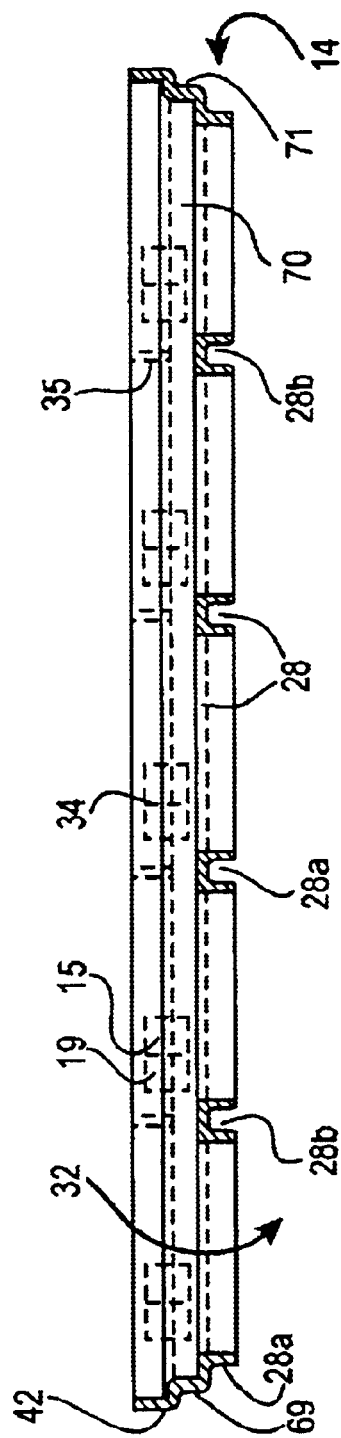

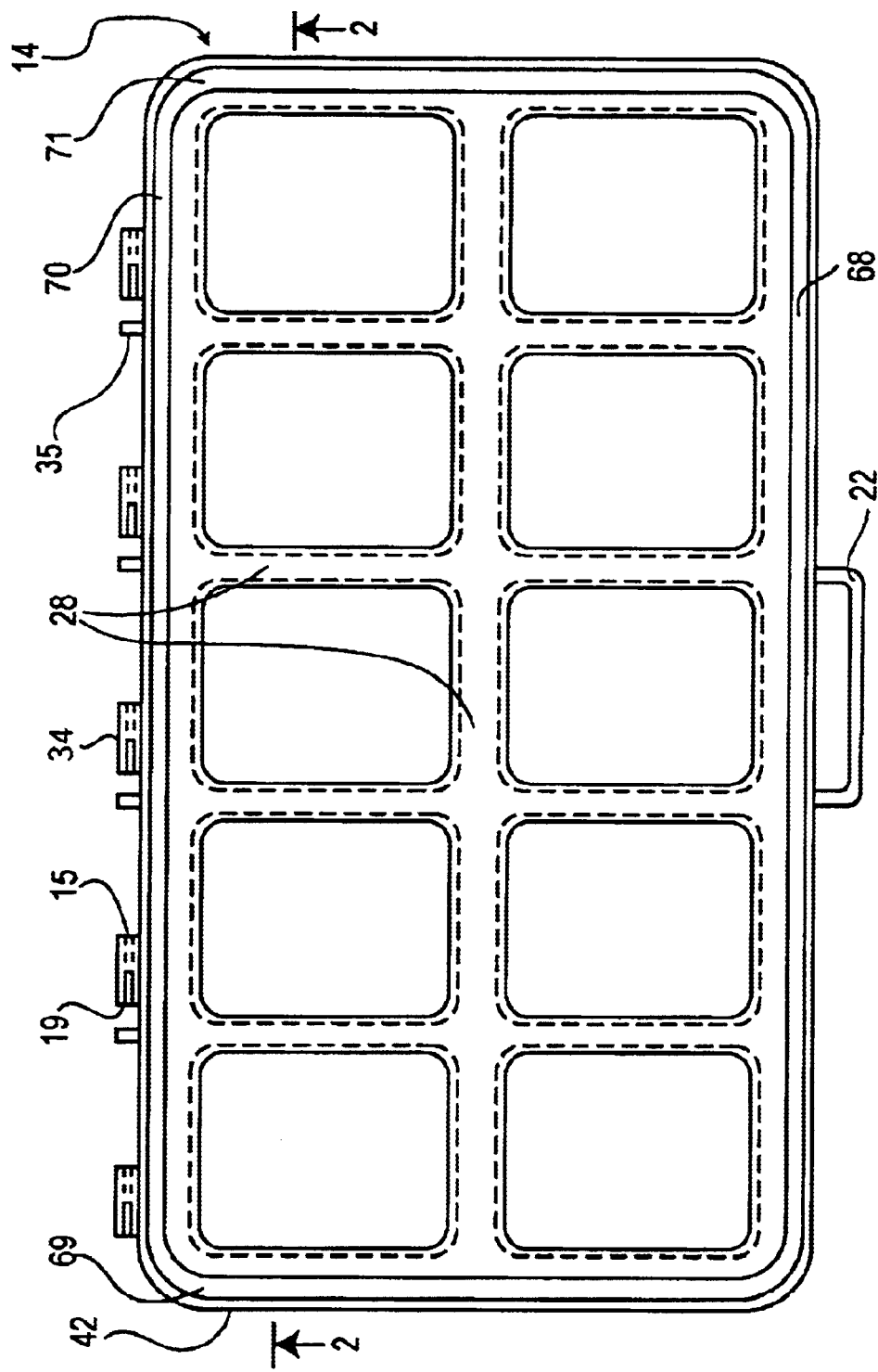

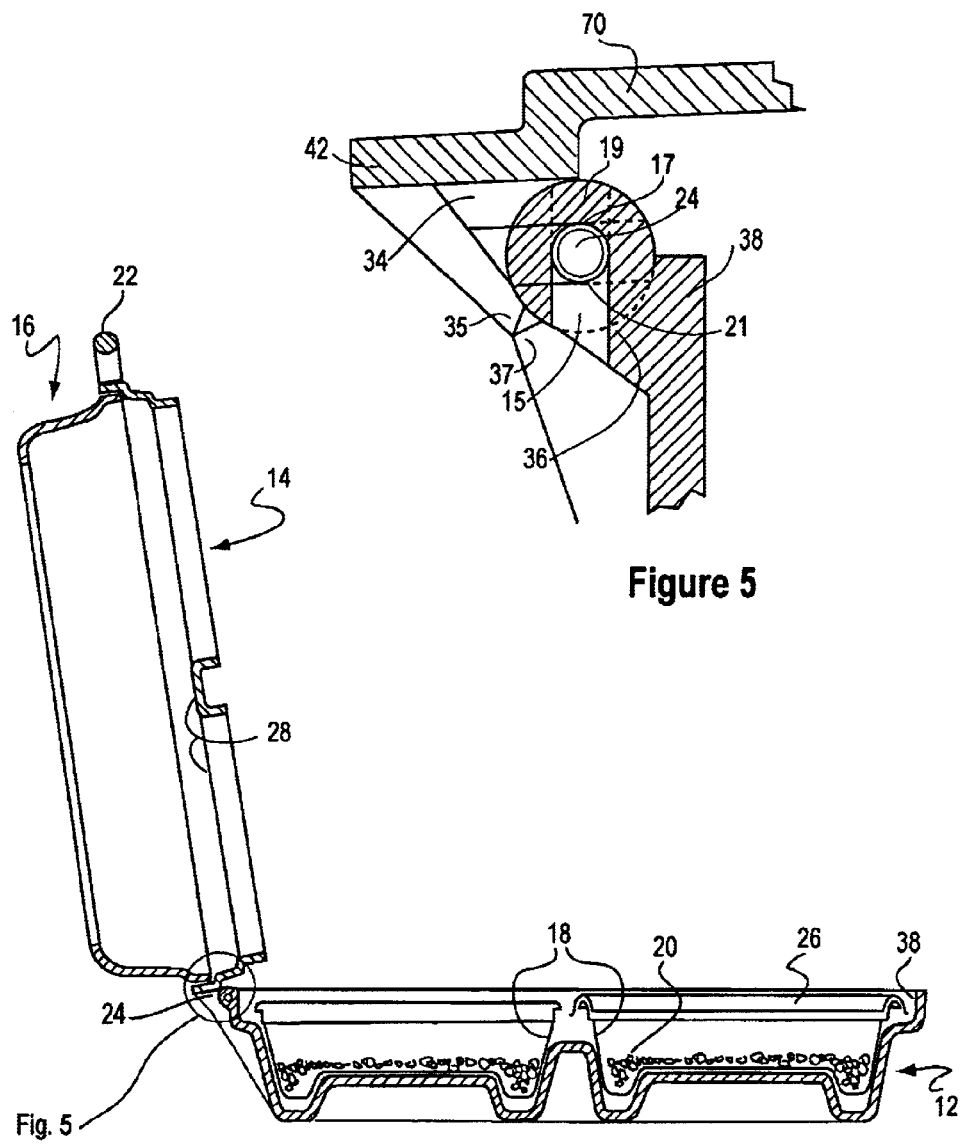

PARTITIONED CAT LITTER BOX

FIELD OF THE INVENTION

Figure 1:
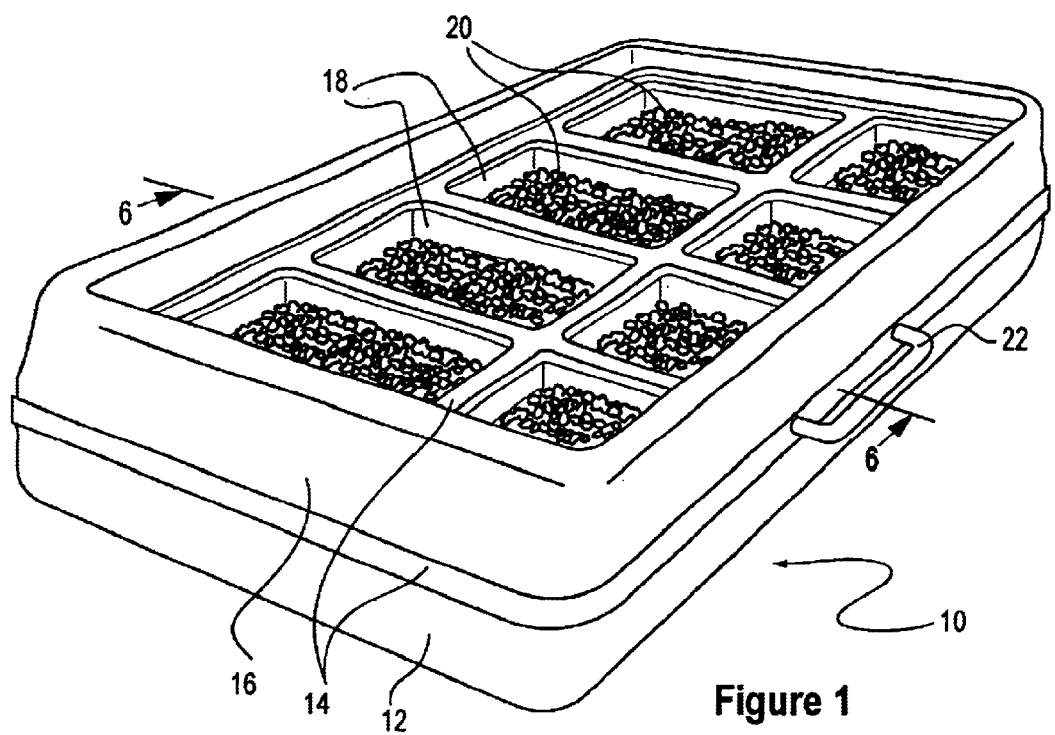

The proposed invention pertains to a cat litter box. More particularly the invention relates to a partitioned polymeric cat litter box, which is adapted to hold an array of individual, removable containers. The device is sanitary, reduces litter consumption and may also be used as an aid for collecting routine urine samples and other medical or dietary information.

BACKGROUND OF THE INVENTION

Most litter boxes of the past use the same basic principle: A relatively large quantity of litter is placed into a tray where faeces are buried and urine is either absorbed by the mass or formed into lumps. The solids are combed, filtered or scooped away but those actions mix the used and unused portions of the litter and the entire contents are often disposed of prematurely to stop odour and bacteria build-up. The box is then cleaned or disposable box dumped, fresh litter loaded and cycle restarted.

In comparison the proposed invention does not mix used and unused portions of litter due to the use of small individual disposable and reusable containers. These not only allow for ease of disposal and substantial saving in litter but also enable the simultaneous use of a variety of litters to suit a number of cats and needs.

The proposed invention has additional uses unknown in the prior art. For example, the proposed device can be converted into a medical information collection aid and back into a normal toilet without sanitation by using fresh disposable containers, loaded with special litters depending on the need. Further, the transparency of the containers allows dietary information collection to be made easily. In addition, urine output volume can be determined easily by weighing the individual used container before and after soiling, even when the liquid urine has been completely absorbed.

SUMMARY OF THE INVENTION

The invention provides a cat litter box comprising a base having side walls surrounding a floor and a peripheral rim. The invention also provides a grille having a plurality of openings formed in it, the openings comprising a grille array, the grille having a peripheral rim which cooperates with the peripheral rim of the base, each opening having a downwardly facing rim.

In some embodiments the floor of the base further comprises an array of mounds which are formed in registry with the grille array.

In other embodiments the base and grille, when attached by their respective peripheral rims are adapted to retain a plurality of disposable containers, the containers having upper rims which are positioned in registry with and concealed by the grille.

In some preferred embodiments the grille further comprises downwardly facing rims which are adapted to enter the mouths of each of the containers.

In some embodiments, the invention provides a cat litter box having a base with a floor comprising an array of mounds, surrounding sidewalls and a peripheral rim. The invention also provides a grille having a plurality of openings formed in registry with the mounds array. The grille has an optional handle and a peripheral rim, which houses an optional containment rim and cooperates with the peripheral rim of the base via an optional hinge. Each grille opening has downwardly facing rounded lips entering the mouths and concealing the upper rims of the individual disclosed novel containers.

Novel containers are also disclosed.

BRIEF DESCRIPTION OF THE DRAWING FIGURES

FIG. 1 Simplified perspective view of the partitioned litter box.

FIG. 2 Cross-sectional view of the grille taken along line 2—2 of FIG. 3.

FIG. 3 Top view of the grille.

FIG. 4 Cross-sectional side view of the opened litter box.

FIG. 5 Enlarged fragmentary view of the hinged area of FIG. 4.

Figure 6:
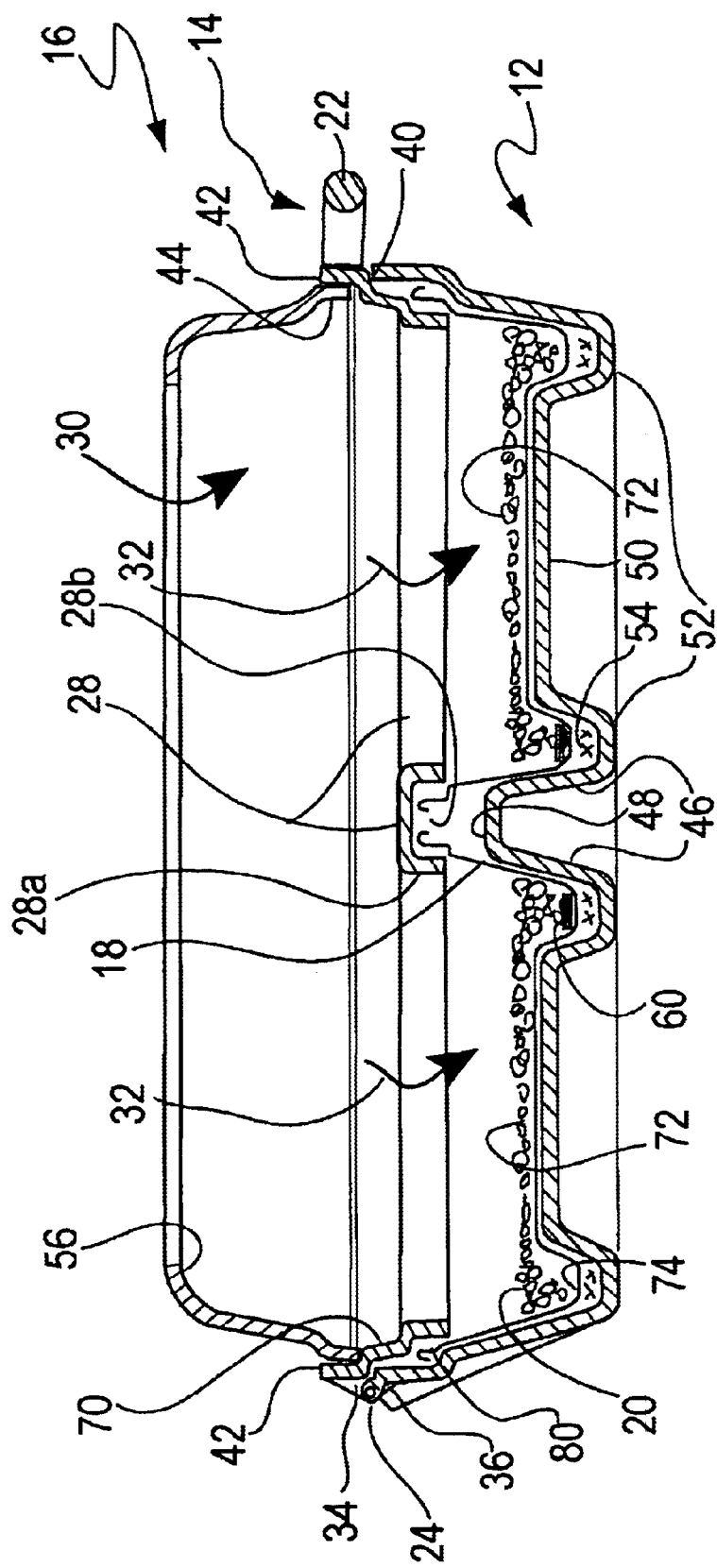

FIG. 6 Cross-sectional view of the litter box taken along line 6—6 of FIG. 1.

Figure 7:
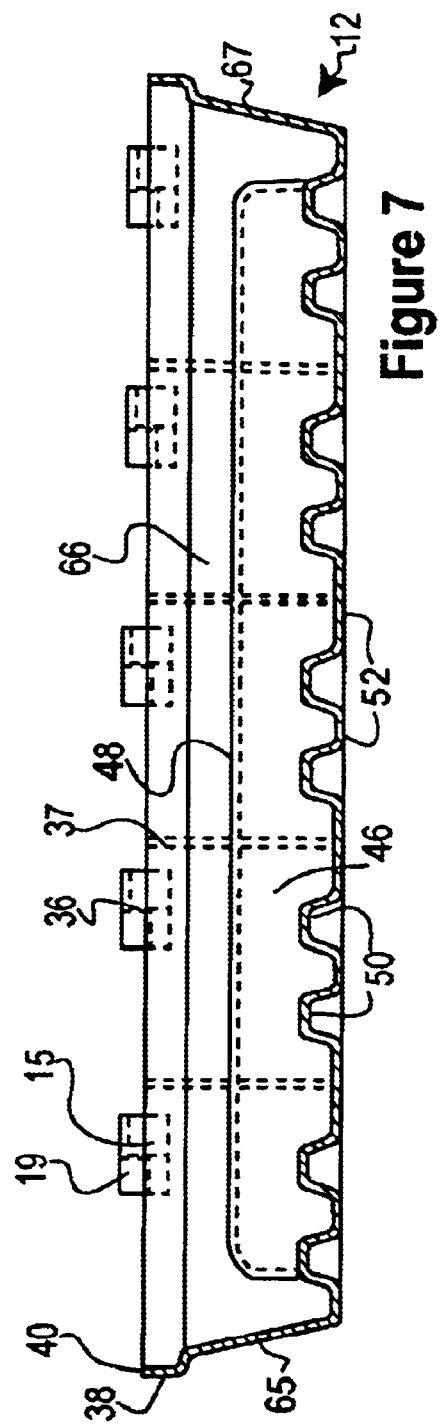
Figure 8:
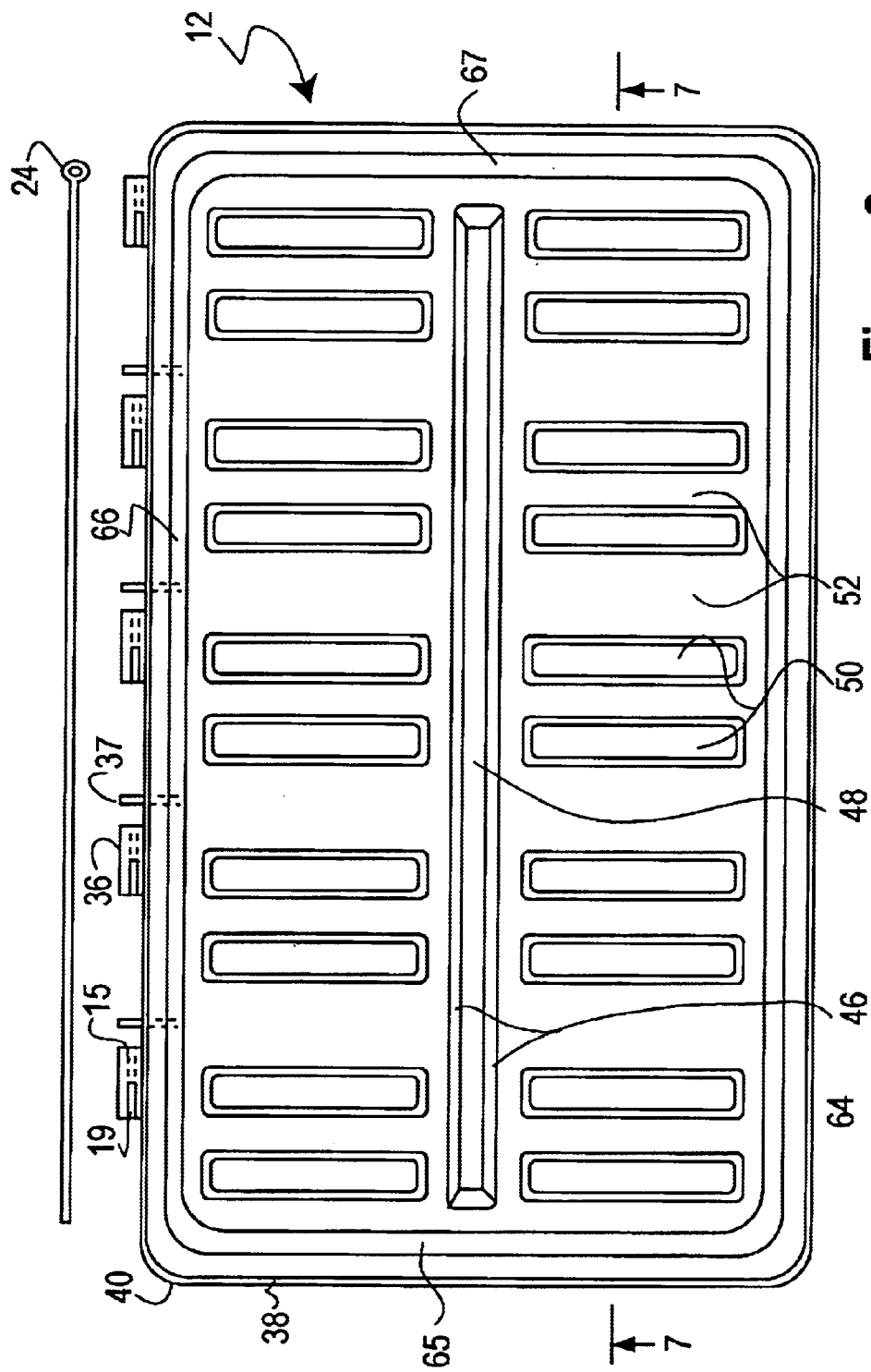

FIG. 7 Cross-sectional view of the base taken along line 7—7 of FIG. 8.

FIG. 8 Simplified top view of the base including the hinge pin.

Figure 9:
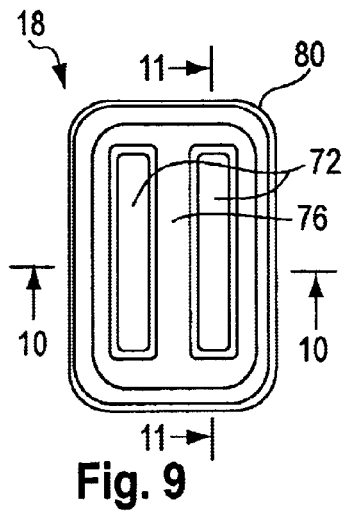

FIG. 9 Simplified top view of the disposable container.

Figure 10:
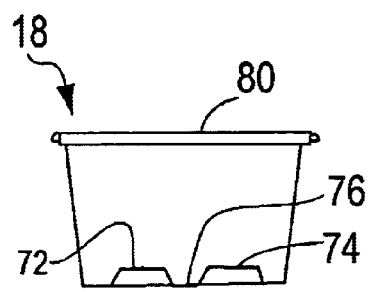

FIG. 10 Cross-sectional view of the disposable container taken along line 10—10 of FIG. 9.

Figure 11:
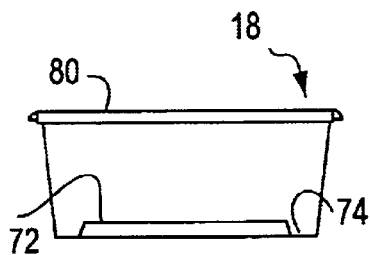

FIG. 11 Cross-sectional view of the disposable container taken along line 11—11 of FIG. 9.

Figure 12:
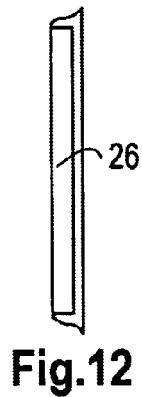
Figure 13:
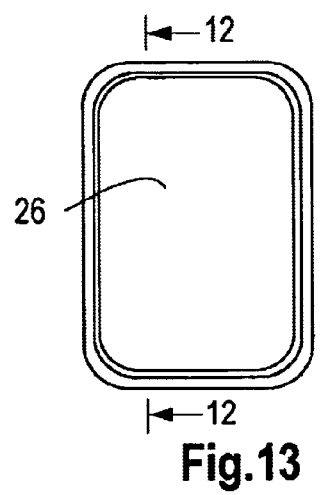

FIG. 12 Cross-sectional view of the disposable snap-on lid taken along line 12—12 of FIG. 13.

FIG. 13 Simplified top view of the disposable snap-on lid.

BEST MODE AND OTHER EMBODIMENTS OF THE INVENTION

FIG. 1 illustrates an example of a partitioned cat litter box 10 of moulded plastic construction. It comprises a base 12, grille 14, optional containment rim 16, containers 18, litter 20 and optional handle 22. With the use of individual containers it is easy to experiment with various litter types and filling heights in order to ascertain the most suitable arrangement for your cat as many cats prefer to urinate in one type of litter and defecate in another. The status of the litter box can be instantly observed without touching it i.e. had the shown box been used, solids would have been directly visible in a small volume of litter and urine would have changed colour of the litter or expanded its volume several times depending on litter type.

FIGS. 2 & 3 are a cross-sectional side view and a top view of grille 14 respectively. Note downward grooves 15, upward grooves 19, optional handle 22, grille partitions 28, rectangular openings 32, hinge halves 34, external ribs 35, stepped-out peripheral wall 42, front wall 68, side wall 69, back wall 70 and side wall 71. The grille partitions, formed in the shape of downward facing channels with parallel rims 28a, serve (in part) to locate the containers and conceal the upper rims of the containers. Note how the grille partition rims 28a enter the mouths of the containers as shown in FIG. 6. The inverted channel 28b between adjacent openings 32 admits two container rims to be positioned side by side without overlapping. The vertical wall of step 42 may be made longer than as shown in the drawings (e.g. FIG. 2) providing an alternate to the separate sanitary or containment rim 16.

FIG. 4 is a simplified overall cross-sectional side view of the opened litter box. Handle 22 is used to open and close grille 14, which frictionally retains the optional containment rim 16. Grille 14 is preferably supported by a demountable hinge held together by removable pin 24 at an angle of approximately 100 degrees from base 12. This allows easy access to all parts of the box. The stepped-out peripheral wall 38 provides a gap between a container and wall 38, which admits the containers' upper rim and disposable lid 26, which can be snapped on any soiled container 18. Used litter 20 is now inside a sanitised container or parcel, which can be lifted out of the base and disposed of cleanly. When containers are reused, lids are not required and a soiled container can be emptied, refilled and reinstalled. Scooping or filtering is not required. The top surfaces of the grille's partitions or channels 28 will need occasional cleaning, which can easily be performed in situ by wiping them, or grille 14 can be detached without tools and cleaned on its own after rim 16 has been removed and hinge pin 24 pulled out. Base 12 and containment rim 16 do not require regular cleaning as soiled litter never touches them and disposable lids 26 are maintenance free.

FIG. 5 is an enlarged fragmentary view of the hinged area of FIG. 4. It shows hinge half 36 and optional external rib 37 moulded onto the peripheral wall 38 of back wall of base 12. Similarly hinge half 34 and optional external rib 35 are moulded onto the peripheral wall 42 of back wall 70 of grille 14. When tips of ribs 35 and 37 meet they stop rotation of the hinge. Grille 14 is thus effectively attached to base 12 by the removable hinge pin 24. Cooperating hinge halves 34 (grille) and 36 (base) themselves are moulded in two sections, one section having an upward groove 19 (dotted lines) with semi circular bottom 21 and the other section having a downward groove 15 with semi circular ceiling 17. Thus no hinge part has a complete bore or tubular cross section. This feature facilitates removal of the moulding tool (not shown) so that the axial passage or 'hole' for hinge pin 24 can be manufactured in series of aligned and paired offset halves without drilling or having moving parts in the manufacturing mould.

FIG. 6 is a cross-sectional side view taken along line 6—6 of FIG. 1. It shows how various litters can be used during different applications. In the normal toilet mode litter 20 can be any type of litter like: clay, wheat, corncob, citrus, cedar wood, straw, peanut shell, orange peel, sand, potting mixture, rice, coconut husk, pine, walnut shell and second hand paper pellet based litters etc. as well as various clumping litters. In the veterinary urine sample collection mode litter 20 can be any practical inert litter material like: plastic beads, paraffin coated sand, rubber granules, un-cooked lentils, aquarium gravel or non-absorbable long lasting litters etc. Cats accept these inert litters better during their illness if their normal favourite litter is placed as decoy litter 54 under the transparent or translucent containers where they can see and smell it without being able to touch it. Decoy litters can be also optionally used to create long lasting odours to entice cats with poor toilet habits into using the litter box, whilst containers are loaded with preferably flushable environmentally friendly litters for normal toilet use. The obtained urine sample can be kept in the container where it was released, sealed with a snap-on lid 26. During more complicated travelling arrangements to the vet, urine can be poured into a small specimen bottle with a liquid tight lid (not shown). All containers are loaded with approximately one cupful of litter and one of them is weighed as representative. The volume of urine can be determined by subtracting the representative clean weight from the soiled weight. Non-absorbable litter materials are preferred but the method works adequately enough with most litters while disposable containers are used directly as 'test tubes'.

Cats have ingress and egress to the interior of the box through large removable rectangular containment rim, which fits snugly into the rim of the grille. The containment rim's main opening 30 provides access to litter 20 via a plurality rectangular funnelled grille openings 32. The edges of the grille openings are rolled over so that the rims 80 of the containers are concealed, as shown in FIG. 6. When hinge pin 24 is removed, hinge halves 34 and 36 can be detached and grille 14 (optionally) incorporating containment rim 16 may be lifted out of base 12 using handle 22, or otherwise. The peripheral wall top edge 40 of base 12 supports grille 14, which in turn with its stepped-out peripheral wall 42 supports and frictionally holds lower peripheral edge or wall 44 of separately moulded containment rim 16. The internal partitioning wall 46 leaves enough fingertip room between its top surface 48 and containers 18 so that they can be removed when grille 14 is tilted open. A plurality of stabilising mounds, being in this example, raised flat topped rectangular mounds 50 with sloping sides, locate and support containers 18 (preferably) above the base's bottom 52 leaving room for optional decoy litter 54. The containers feature raised bottom portions 72, which cooperate with mounds 50 and are located in position by them allowing the containers to rest firmly on the raised mounds 50 without rocking. This also facilitates the use of decoy litter below the container bottom 74. Containment rim 16 has a preferred inwardly curving peripheral top lip 56 defining the central entrance to the box. Containment rim 16 minimises litter spillage and tracking. It also stops cats straddling over the sidewalls of the litter box, which happens with conventional trays where cats void themselves accidentally on the wrong side of the wall. Some cats dig vigorously to void themselves in conventional trays. Cats perform hardly any digging in this device. The litter appears to be already deep enough to be used without digging. Less digging minimizes subsequent tracking. In traditional litter boxes cats can exit the box only from the litter surface whereas in this invention there is a provision for cats to step or walk on top of the grille channels before jumping out of the box further reducing tracking of litter.

If the base were constructed with a flat bottom without mounds 50, any amount of litter spilled onto the base during incorrect procedure of refilling the containers would elevate at least one corner of one of the containers preventing the grille being closed correctly upon the containers. Also, if the containers had flat bottoms without raised portions 72 and associated 'urine grooves' a small amount of litter would not be sufficient to prevent cats from stepping into their own urine and exiting with wet paws. That is why conventional litter trays with flat bottoms require a large bucketful of litter whereas this invention with grooved containers manages with a small amount.

FIGS. 7 & 8 are a cross-sectional side view and a top view of base 12 respectively. Note downward hinge grooves 15, upward hinge grooves 19, hinge pin 24, hinge halves 36, external ribs 37 strengthening back wall 66, stepped out peripheral wall 38 (for receiving the grille), peripheral wall top edge 40, longitudinal and centrally located partitioning wall 46 with sloping sides, partitioning wall upper surface 48, raised flat topped mounds 50 with sloping sides, bottom wall 52, front wall 64 and side walls 65 and 67. The partitioning wall 46 stabilizes the containers against excessive transverse movement. It will be appreciated that mounds 50 may be provided in a variety of shapes and sizes for the purpose of locating and retaining the containers. In preferred embodiments mounds 50 are provided in shapes, which are generally incompatible with standard containers (which do not have deep enough grooves for adequate urine containment) so that a proprietary container may be used. The array characteristics are that the base holds a plurality of containers in a close fitting arrangement and that the arrangement be coverable by a grille, which operates to conceal the edges of the containers. The illustrations of the present disclosure suggest a 5×2 array. Other rectangular arrays are also acceptable. Even irregular and radial, radially symmetrical or pie shaped arrays are considered suitable.

FIGS. 9, 10 & 11 are a simplified top view and cross-sectional side views of disposable container 18 respectively. The illustrated container with rim 80 and two raised flat-topped rectangular portions 72 with sloping sides on bottom 74 is generally similar to a common plastic disposable food container having only a shallow single mound strengthening the bottom wall. When this invention was developed and tested using various disposable food containers ranging from 500 to 1000 ml it was observed that due to the small amount of litter being used it was important that urine drained quickly to bottom grooves 74. A single mound with only a peripheral groove was not sufficient to accommodate surprisingly large volume of urine in some cases. The best mode proposes approximately 650 ml size container with two approximately 15 mm high portions 72 forming a deeper additional central groove 76, which together with the peripheral groove 74 would not only hold the urine but also reduce the litter being tossed out from the container.

FIGS. 12 & 13 are a cross-sectional side view and a simplified top view of disposable snap-on lid 26 respectively. As they are so commonly known and due to their thin-walled plastic construction they are sketched briefly with single lines.

While the above descriptions contain several specifics, these should not be construed as limiting but merely illustrations. Various modifications can be easily made to this invention. For example the number of containers could be changed to 8 in 2×4 or 9 in 3×3 or into 12 in 3×4, or other formats. The shape and size of the container can be easily changed from the illustrated container. If different containers are chosen or custom made, most dimensions in the base, grille and rim will change accordingly.

Similarly, hinges can be made several ways and this invention works well without any hinges and they do not have to be moulded nor detachable nor restricted to 100 degree tilting angle resting on the hinge pin, but as the box is opened frequently, hinges facilitate the process.

It will be appreciated that the system provides for the promotion of proprietary containers, which may be pre-packaged and labelled by their respective manufacturer for use with a litter box according to above teachings. Container packaging may include litter or medical test strips or indicators of various kinds.

From the aforementioned constructional facts it will be appreciated that the invention provides that soiled litter remains in separate containers for ease of disposal. Thus urine, odours and bacteria are not accumulated for long periods. Flushing a small cupful of litter down the toilet and reusing disposable containers makes substantial savings to the individuals and minimises waste. Consequently, litter consumption is less than that of traditional litter boxes. Conveniently, it can be instantly seen if any part of the litter box has been used without touching it and scooping or filtering is not required. Different litter types and filling heights can be used simultaneously in individual containers. Inward curve on the optional containment rim minimises spillage and tracking, however, litter box height can be reduced for kittens or injured cats by removing the detachable containment rim. The hinged grille can be detached from the base for easy cleaning. The device also has a number of health related advantages. Urine samples can be collected conveniently at home without stress to the cats. Urine output can be determined by weighing individual containers before and after soiling.

Accordingly, the scope and the spirit of the invention should be determined by the appended claims and their factual and legal equivalents, rather than the illustrated embodiments and given examples.

What is claimed is:

1. A cat litter box comprising:

a base, the base having side walls surrounding a floor and a peripheral rim; and a grille, the grille having a plurality of openings formed in it, the openings comprising a grille array, and a peripheral rim which cooperates with the peripheral rim of the base, each opening having a downwardly facing rim;

the sidewalls of the base being high enough that one or more litter containers with upper rims may be positioned between the grille and the floor;

the downward facing rim of each opening defining a single aperture, the downward facing rim adapted to fit within and thereby conceal the upper rim of a container.

2. The cat litter box of claim 1, wherein:

the floor of the base further comprises an array of mounds which are formed in registry with the grille array.

3. The cat litter box of claim 2, further comprising:

at least one container having a bottom which is configured to cooperate and interlock with at least one mound.

4. The cat litter box of claim 2, wherein:

the mounds support a container, when a container is fitted, above the floor of the base sufficiently high for decoy cat litter to be positioned between the bottom of the container and the floor.

5. The cat litter box of claim 2, wherein:

the base and grille, adapted to retain a plurality of disposable containers, each container having an upper rim defining a container mouth, each upper rim being in registry with and concealed by the grille.

6. The cat litter box of claim 5, wherein:

the grille further comprises grille partitions having downwardly facing rims which are adapted to enter the mouths of each of the containers.

7. The cat litter box of claim 6, further comprising:

one or more containers sized to fit under an opening and be retained between the grille and the floor of the base.

8. The cat litter box of claim 7, wherein:

the base further comprises a raised central longitudinal partition.

9. The cat litter box of claim 8, wherein:

the height of the raised partition permits a finger to be inserted between an upper edge of a container and the raised partition when a container is on a mound.

10. The cat litter box of claim 6, wherein:

the mounds support a container, when a container is fitted, above the floor of the base sufficiently high for decoy cat litter to be positioned between the bottom of the container and the floor.

11. The cat litter box of claim 1, wherein:

a peripheral rim of the grille forms a step which is adapted to receive the peripheral edge of a containment rim, the containment rim having an inward curving lip which defines a central entrance.

12. The cat litter box of claim 1, further comprising:

one or more containers sized to fit under an opening and be retained between the grille and the floor of the base.

13. The cat litter box of claim 12, wherein:

the one or more containers are translucent or transparent.

14. The cat litter box of claim 1, wherein:

the floor of the base further comprises an array of raised mounds which define locations under the openings, for receiving individual containers.

15. The cat litter box of claim 1, wherein:

the base and grille are hinged to one another, there being provided a removable hinge pin about which the grille may rotate relative to the base when they are attached.

16. The cat litter box of claim 1, wherein:

the base and grille are hinged together and the grille has a handle.

17. In combination, a cat litter box of claim 1 and a number of containers, each container having a disposable plastic body and lid, the number of containers being at least equal to the number of openings.

18. A container for a cat litter box, the container comprising:

a disposable plastic body and lid, the body having a bottom in which is formed one or more raised portions which are adapted to interlock with a like number of cooperating mounds formed on a floor of a cat litter box so that the container is positioned by the mounds below a grille of the cat litter box;

a pre-packaged charge of cat litter contained in the body and retained by the lid.

19. The container of claim 18, wherein:

the raised portions are such that the bottom of the container is positioned vertically above the floor of the cat litter box when the container is installed, the vertical position being high enough for decoy litter to be positioned between the floor and the bottom of the container.

20. The container of claim 18, wherein:

the raised portions are two in number.

* * * * *